(12) United States Patent
Wang et al.

(10) Patent No.: US 12,493,107 B2
(45) Date of Patent: Dec. 9, 2025

(54) OPTICAL SENSOR HAVING OPAQUE SIDEWALL COATING

(71) Applicant: Apple Inc., Cupertino, CA (US)

(72) Inventors: Yifei Wang, Sunnyvale, CA (US); Chih-Wei Chuang, Albany, CA (US); Xiaoyang Zhang, Singapore (SG); Zhenbin Ge, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1129 days.

(21) Appl. No.: 17/467,884

(22) Filed: Sep. 7, 2021

(65) Prior Publication Data
US 2023/0070515 A1 Mar. 9, 2023

(51) Int. Cl.
G01C 3/08 (2006.01)
G01S 7/481 (2006.01)
G01S 7/4912 (2020.01)
G01S 17/04 (2020.01)

(52) U.S. Cl.
CPC ............ G01S 7/481 (2013.01); G01S 7/4912 (2013.01); G01S 17/04 (2020.01)

(58) Field of Classification Search
CPC ......... G01S 7/481; G01S 7/4912; G01S 17/04
See application file for complete search history.

(56) References Cited

U.S. PATENT DOCUMENTS

| | | | |
|---|---|---|---|
| 8,217,482 B2 | 7/2012 | Basoor et al. | |
| 9,182,789 B2 | 11/2015 | Hill et al. | |
| 9,263,618 B2 | 2/2016 | Ruh et al. | |
| 9,733,357 B2 | 8/2017 | Costello et al. | |
| 12,313,779 B2* | 5/2025 | Hegde | G01J 1/0425 |
| 2006/0128126 A1 | 6/2006 | Adkisson et al. | |
| 2010/0282951 A1 | 11/2010 | Costello et al. | |
| 2012/0070145 A1* | 3/2012 | Wong | B05D 1/325 |
| | | | 361/818 |
| 2018/0130843 A1* | 5/2018 | Jo | H10F 39/192 |

FOREIGN PATENT DOCUMENTS

| | | | | |
|---|---|---|---|---|
| KR | 20060013504 A | * | 2/2006 | ............ G01N 21/64 |
| KR | 20170055090 A | * | 5/2017 | ......... H01L 31/1868 |

OTHER PUBLICATIONS

Edge-illuminated Self-hermetic Monitor Photodiode (EMPD) Chip, Materials That Matter, 2020, pp. 1-3, II-VI Incorporated Legal notices: ii-vi.com/legal.

* cited by examiner

*Primary Examiner* — Mark Hellner
(74) *Attorney, Agent, or Firm* — Treyz Law Group; Jason Tsai

(57) ABSTRACT

An electronic device may include a proximity sensor for detecting whether an external object is in the vicinity of the device. The proximity sensor may be implemented as an optical sensor module having a substrate, a light emitter die mounted on the substrate, a light detector die mounted on the substrate, and a package enclosure housing the light emitter and detector dies within the module. A infrared bandpass filter layer may be formed directly on the light detector die. The light detector die may have sidewalls at least partially covered by an opaque coating. The light detector die may include a highly doped backside reflection absorption layer interposed between an intrinsic absorption layer and an n-type layer within the light detector die. Opaque adhesive material may be used to mount the light detector die onto the surface of the substrate.

19 Claims, 13 Drawing Sheets

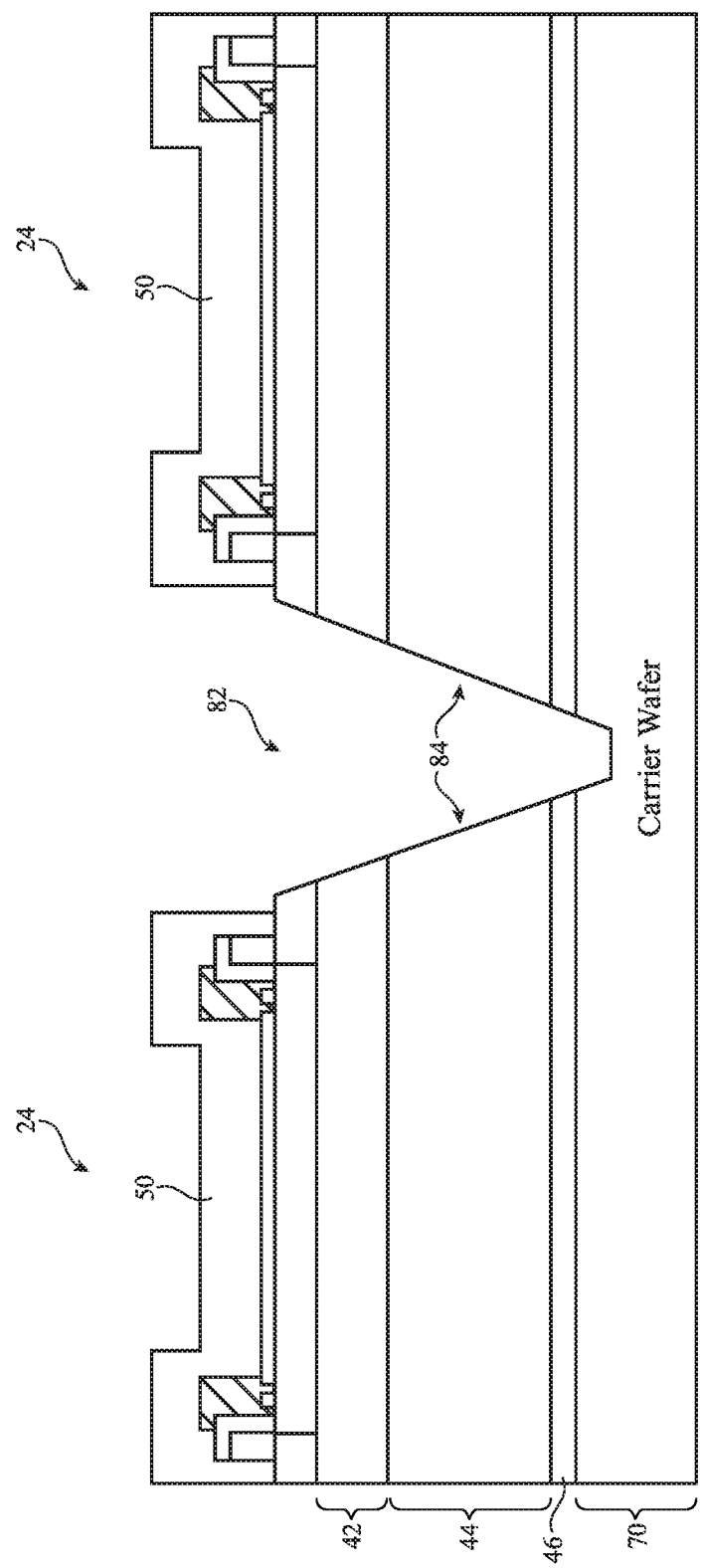

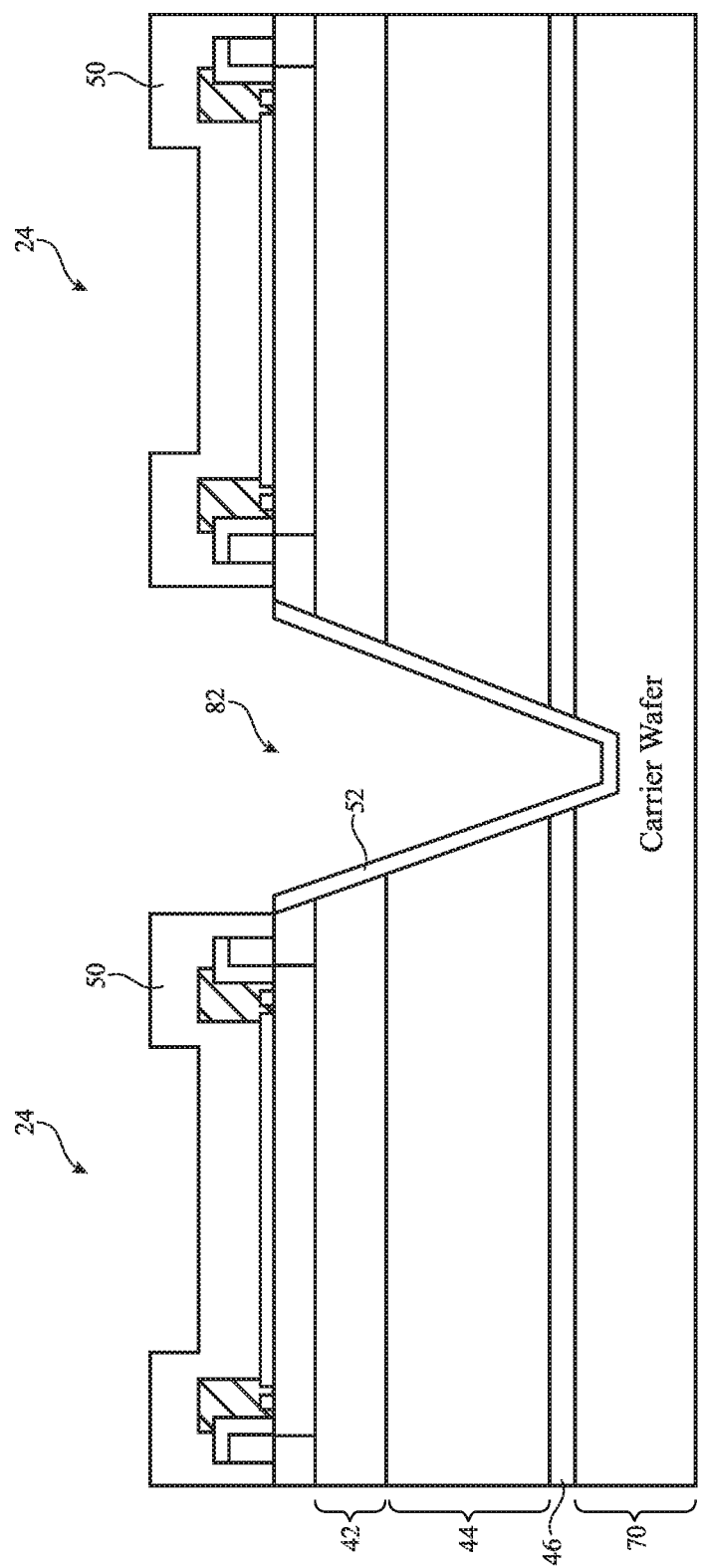

OPTICAL SENSOR HAVING OPAQUE SIDEWALL COATING

FIELD

This relates generally to electronic devices and, more particularly, to electronic devices with proximity sensors.

BACKGROUND

Electronic devices often include components that have sensors. For example, earbuds, cellular telephones, and other devices sometimes have light-based components such as light-based proximity sensors. A light-based proximity sensor may have a light source such as an infrared light-emitting diode and may have a light detector.

During operation, the light source emits light. In the presence of nearby objects, some of the emitted light is reflected back towards the proximity sensor and is detected by the light detector. By monitoring the amount of reflected light at the light detector, an electronic device may determine whether an external object is in the vicinity of the electronic device. It can be challenging to design a proximity sensor.

SUMMARY

An electronic device may have control circuitry and input-output components. The input-output components may include audio components, sensors, displays, and other devices. A proximity sensor may supply the control circuitry with proximity sensor data. The control circuitry may adjust the audio components, displays, or take other suitable action in response to proximity sensor readings from the proximity sensor.

In accordance with some embodiments, an optical proximity sensor device is provided that includes: a substrate; a semiconductor die mounted on the substrate, the semiconductor die having an upper surface, a lower surface, a sidewall extending between the upper and lower surfaces, and an opaque coating covering the sidewall; and a package enclosure attached to the substrate and having an opening through which light passes through to the upper surface of the semiconductor die. The optical proximity sensor device can further include a light source configured to emit light, where the semiconductor die is configured to measure an amount of the light reflecting back from an external object to produce a proximity sensor reading. An infrared bandpass filter coating can be formed directly on the semiconductor die. A metal layer can be formed on the lower surface of the semiconductor die. The sidewall can be an inclined or sloped sidewall that is partially or completely (entirely) covered by the opaque coating.

In accordance with some embodiments, a method for manufacturing a semiconductor die is provided. The method can include: forming a photo-sensitive element in a semiconductor substrate having an upper surface and a lower surface; forming an infrared bandpass filter layer over the upper surface of the semiconductor substrate; forming a metal layer at the lower surface of the semiconductor substrate; forming sidewalls of the semiconductor die by forming trenches in the semiconductor substrate, where the sidewalls extend between the upper and lower surfaces of the semiconductor substrate; and forming an opaque coating in the trenches. The opaque coating can least partially cover the sidewalls of the semiconductor die. The opaque coating can be a reflective coating or an absorptive coating such as black ink. The sidewalls of the semiconductor die can be sloped (angled) to facilitate formation of the opaque coating.

In accordance with some embodiments, an electronic device is provided that includes an input-output device, a proximity sensor module configured to detect when a human body part is in a vicinity of the electronic device, and control circuitry configured to adjust the input-output device in response to detecting that a human body part is in the vicinity of the electronic device. The proximity sensor module can include a printed circuit board, a light emitter die mounted on the printed circuit board, a light detector die mounted on the printed circuit board, opaque material configured to adhere the light detector die to the printed circuit board, and a package enclosure attached to the printed circuit board and having windows aligned to the light emitter die and the light detector die. The control circuitry can adjust audio output and/or media playback operations, may change the operation of communications functions (e.g., cellular telephone operations) for a paired device, may temporarily disable a touch-screen display, or may take other suitable action.

BRIEF DESCRIPTION OF THE DRAWINGS

FIGS. 5, 6A, 6B, 7A, 7B, 8A, and 8B are cross-sectional side views illustrating a process for manufacturing a light detector die with opaque sidewall coating in accordance with some embodiments.

DETAILED DESCRIPTION

Electronic devices may be provided with light-based components. The light-based components may include, for example, light-based proximity sensors. A light-based proximity sensor may have a light source such as an infrared light source and may have a light detector that detects whether light from the infrared light source has been reflected from an external object in the vicinity of an electronic device. Light sources may also be used as part of light-based transceivers, status indicator lights, displays, light-based touch sensors, light-based switches, and other light-based components. Illustrative configurations in which an electronic device is provided with a light-based component such as a light-based proximity sensor may sometimes be described herein as an example.

Figure 1:
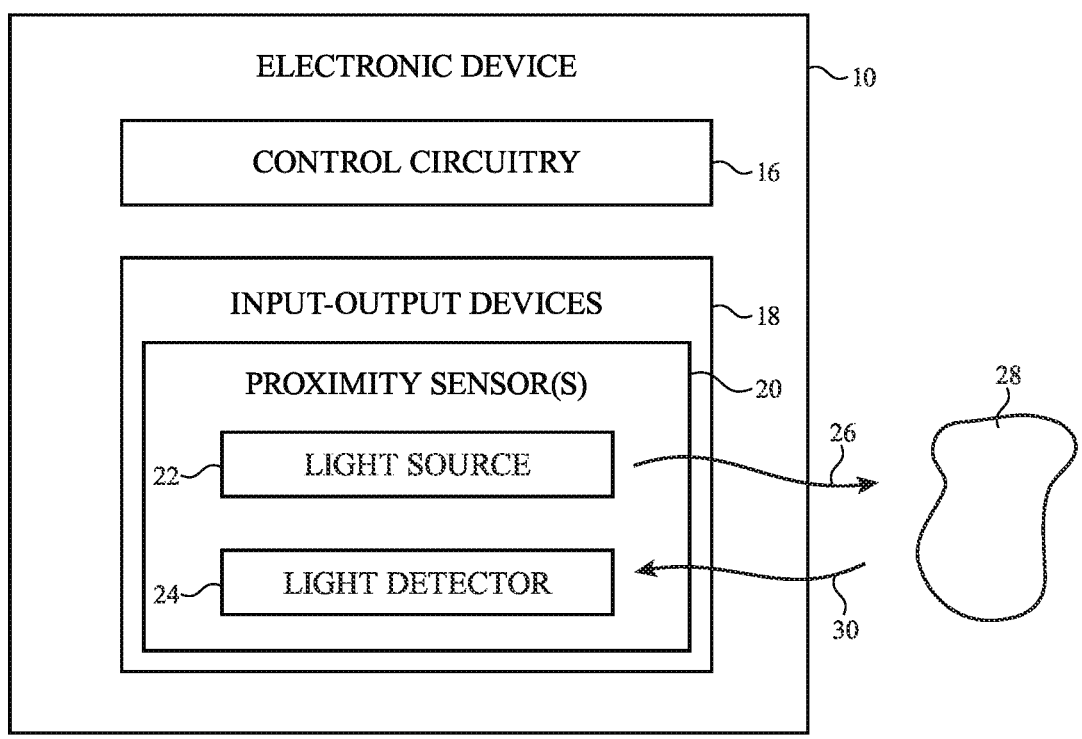
FIG. 1 is a schematic diagram of an illustrative electronic device in accordance with some embodiments.

FIG. 1 is a schematic diagram of an illustrative electronic device of the type that may include a light-based proximity sensor. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device such as a set of wireless or wired earbuds, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment.

As shown in FIG. 1, device 10 may include storage and processing circuitry such as control circuitry 16. Circuitry 16 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 16 may be used to control the operation of device 10. This processing circuitry may be based on one or more microprocessors, microcontrollers, digital signal processors, baseband processor integrated circuits, application specific integrated circuits, other circuits with logic circuitry for producing digital control signals, etc.

Circuitry 16 may be used to run software on device 10. The software may control the operation of sensors and other components in device 10. For example, the software may allow circuitry 16 to control the operation of light-based proximity sensors and to take suitable actions based on proximity data gathered from the light-based proximity sensors. As an example, a light-based proximity sensor may be used to detect when a wireless earbud is in the ear of a user or may be used to detect when other user (human) body parts are in the vicinity of an electronic device. Based on information on whether or not the earbud is in the ear of a user or is otherwise in a particular position relative to a user, the software running on control circuitry 16 may adjust audio output and/or media playback operations, may change the operation of communications functions (e.g., cellular telephone operations) for a paired cellular telephone or other additional device that is associated with the earbud, or may take other suitable action.

As another example, the light-based proximity sensor may be used to detect when a cellular telephone has been brought into close proximity with a user's head or other body part (e.g., within 1 cm, within 2 cm, within 5 cm, etc.). Based on information about whether or not the cellular telephone is brought up to a user's head or is in a particular position relative to a user, the software running on control circuitry 16 may adjust the brightness of a display within device 10, may deactivate the display, may deactivate any touch functions associated with the display, or may take other suitable action.

To support interactions with external equipment, circuitry 16 may be used in implementing communications protocols. Communications protocols that may be implemented using circuitry 16 include wireless local area network protocols (e.g., IEEE 802.11 protocols—sometimes referred to as WiFi®), protocols for other short-range wireless communications links such as the Bluetooth® protocol, cellular telephone protocols, near-field communications protocols, and other wireless communications protocols.

Device 10 may include input-output devices 18. Input-output devices 18 may be used to allow data to be supplied to device 10 and to allow data to be provided from device 10 to external devices. Input-output devices 18 may include touch screens, displays without touch sensor capabilities, buttons, joysticks, scrolling wheels, touch pads, key pads, keyboards, microphones, cameras, speakers, status indicators, light sources, audio jacks and other audio port components, light sensors, accelerometers, and other sensors, and input-output components. These components may include light-based components such as components with light sources. As shown in FIG. 1, device 10 may a light-based component such as one or more light-based proximity sensor(s) 20.

Proximity sensor 20 may include light source 22 and light detector 24. Light source 22 may emit light 26 that has the potential to be reflected from external objects such as object 28 (e.g., the ear or other body part of a user, inanimate objects, or other objects). Light detector 24 may measure how much of emitted light 26 is reflected towards device 10 as reflected light 30 and may therefore be used in determining whether an external object such as object 28 is present in the vicinity of device 10. Light 26 may be infrared light, visible light, or ultraviolet light (as examples). Infrared light is not visible to a user and is detectable by semiconductor infrared light detectors, so it may be desirable to form light source 22 from a component that emits infrared light. Light source 22 may be a light-emitting component such as a light-emitting diode or a laser diode (as examples). Proximity sensor 20 may output a proximity sensor reading (e.g., a proximity sensor output that is proportional to the distance between device 10 and object 28), and control circuitry 16 may monitor the proximity sensor reading and compare the proximity sensor reading to a predetermined threshold to detect proximity to external object 28.

A conventional proximity sensor typically includes a light source and a light detector formed within a package (sometimes referred to as an optical sensor module). The optical sensor module often includes a separate glass layer formed over the light source and the light detector. Anti-reflective coating material is formed on one or more surfaces of the glass layer to reduce stray reflections. Bandpass filter coating material is formed on one or more surfaces of the glass layer to allow light of selected wavelengths to exit and enter the module through the glass layer. The glass layer can have a thickness of over 200 microns, which increases the overall thickness of the proximity sensor package.

Figure 2:
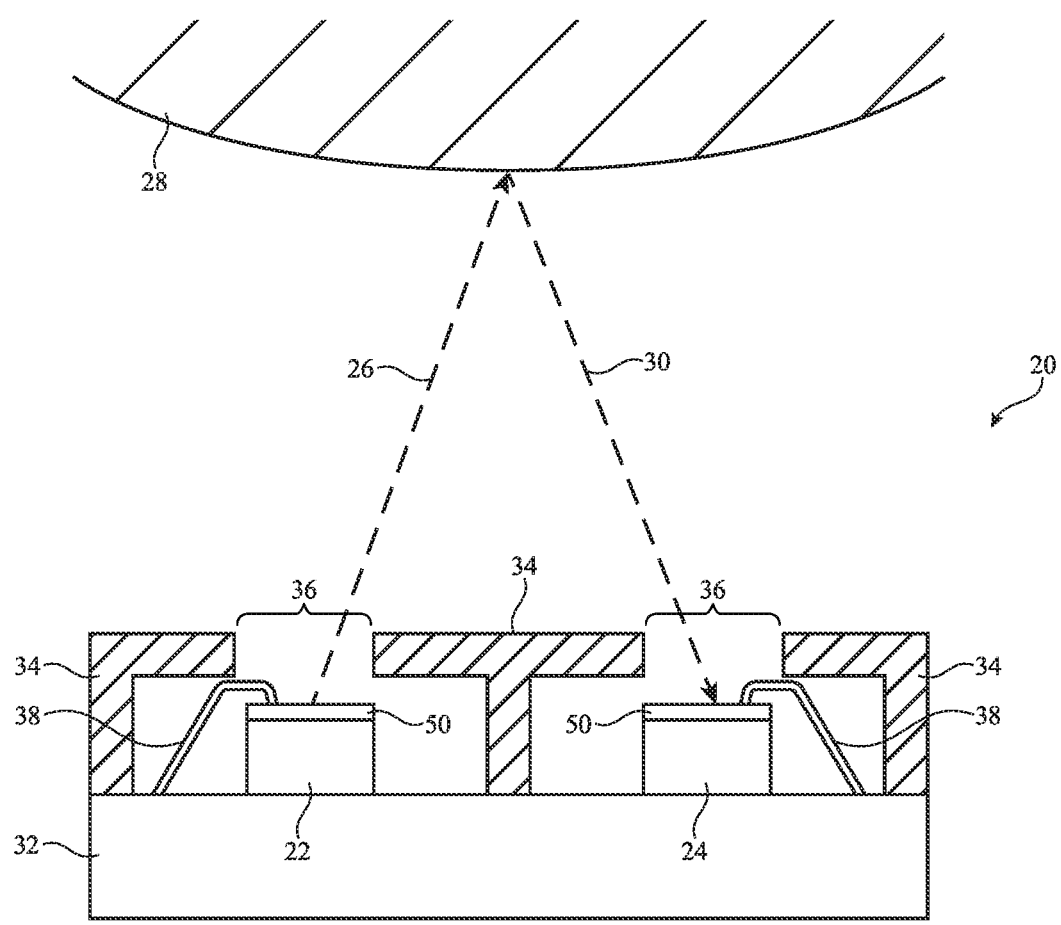
FIG. 2 is a side view of an illustrative optical proximity sensor in accordance with some embodiments.

To reduce the overall thickness of proximity sensor 20, a bandpass filter coating layer can be formed directly on the light source and the light detector. Forming a bandpass filter coating layer directly on a light emitter semiconductor die and a light detector semiconductor die instead of on a separate glass layer obviates the need for a separate glass layer. FIG. 2 is a side view of an illustrative optical proximity sensor 20 that does not include a separate glass layer formed over light source 22 and light detector 24. As shown in FIG. 2, proximity sensor 20 may include a substrate such as printed circuit board (PCB) 32. Printed circuit board (or substrate) 32 may include one or more layers of metal or conductive traces formed within layers of dielectric substrate material. Substrate 32 may be formed using dielectric materials such as resin, epoxy, fiberglass, glass-reinforced epoxy laminate material, polyimide or other polymer, Teflon, and/or other suitable substrate material.

Light source 22 may be a light emitter semiconductor die mounted on substrate (PCB) 32. The light emitter semiconductor die 22 may include an a light-emitting diode or a laser diode. A bandpass filter coating such as bandpass filter coating layer 50 may be formed directly on light emitter semiconductor die 22. Bandpass filter coating 50 may transmit light in a selected range of wavelengths.

Figure 4:
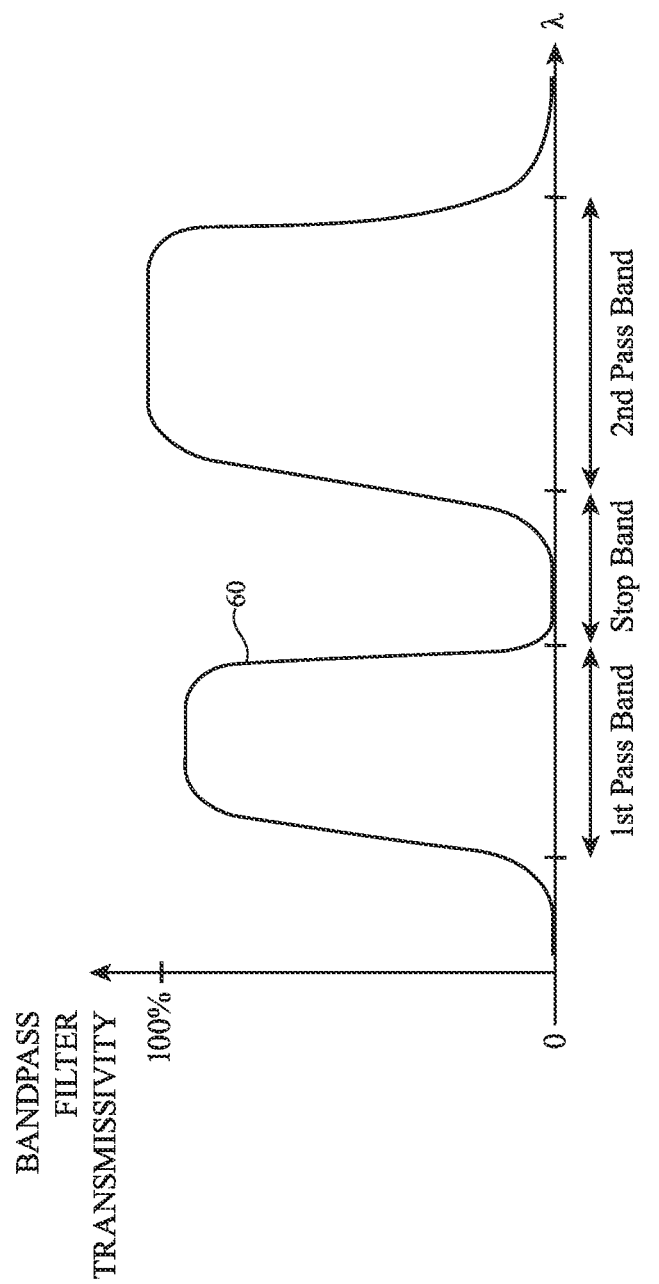
FIG. 4 is a diagram of light transmissivity as a function of wavelength for a bandpass filter layer formed on a light detector die in accordance with some embodiments.

FIG. 4 illustrates an exemplary transmissivity profile for bandpass filter coating 50. As shown my curve 60 in FIG. 4, bandpass filter coating 50 may exhibit high light transmittance levels in two different pass bands that are separated by a stop band. A first passband might correspond to a first range of wavelengths in which the human skin exhibits a high amount of reflection. A second passband might correspond to a second range of wavelengths in which the human skin exhibits a low amount of reflection. A stop band is interposed between the first and second passbands to reject wavelengths between the two extremes, which can help enhance the signal-to-noise ratio of the proximity sensor reading.

As an example, the first pass band might cover wavelengths between 1000 and 1150 nanometers (nm), whereas the second pass band might cover wavelengths between 1350 and 1600 nm. In this example, the interposing stop band would be between 1150 and 1350 nm. These ranges are merely illustrative. If desired, bandpass filter coating 50 can exhibit one or more pass bands covering any desired range of frequencies. Illustrative configurations in which bandpass filter coating 50 transmits only infrared light are sometimes described herein as an example. Light source 22 is therefore sometimes referred to as an infrared light emitting semiconductor die (component).

Light detector 24 may be a photodetector semiconductor die mounted on substrate (PCB) 32. The photodetector semiconductor die 24 may include a photosensitive element such as a photodiode. A bandpass filter coating such as bandpass filter coating layer 50 may also be formed directly on photodetector semiconductor die 24. Bandpass filter coating 50 may transmit light in a selected range of wavelengths (see, e.g., FIG. 4). In general, bandpass filter coating 50 can exhibit one or more pass bands covering any desired range of frequencies. Illustrative configurations in which bandpass filter coating 50 transmits only infrared light are sometimes described herein as an example. Bandpass filter layer 50 is therefore sometimes referred to as an infrared bandpass filter layer. Light detector 24 is therefore sometimes referred to as an infrared photodetector semiconductor die (component).

In the example of FIG. 2, semiconductor dies 22 and 24 are shown as being wire-bonded to substrate 32 via one or more wires 38. This is merely illustrative. In other suitable configurations, dies 22 and 24 may be bonded to substrate 32 via metal contact leads or flip-chip bonded to substrate 32 via solder balls or pins.

Sensor 20 may further include a package enclosure (housing) structure such as package enclosure 34 attached to substrate 32. Package enclosure 34 may include package walls laterally surrounding dies 22 and 24 and may form openings (windows) 36 aligned to dies 22 and 24. Package enclosure 34 may be formed from molded plastic or epoxy, ceramic, glass, metal, a combination of these materials, and/or other suitable semiconductor packaging materials. For example, package enclosure 34 may have a first opening 36 aligned with light emitter die 22. The first opening 36 may be configured to allow light emitted from emitter die 22 to exit sensor 20 as shown by outgoing light ray 26. Package enclosure 34 may have a second opening 36 aligned with light detector die 24. The second opening 36 may be configured to allow any of the emitted light reflecting back from external object 28 (e.g., a user's skin or body part) to re-enter sensor 20 and reach photodetector die 24 as shown by incoming light ray 30. Operated in this way, optical sensor 20 can gather or produce proximity sensor readings so that control circuitry 16 (see FIG. 1) can determine whether an external object 28 is within the vicinity or close proximity to electronic device 10 so that appropriate action can be taken.

Proximity sensor 20 configured in this way is sometimes referred to as an optical device, an optical sensor module, or an optical sensor package. In the example of FIG. 2, bandpass filter coating 50 is formed directly on light emitter die 22 and photodetector die 24. In other words, optical sensor package 20 is devoid of a separate glass layer formed over the light source and light detector. An optical sensor package (module) formed in this way exhibits a reduced overall thickness relative to conventional proximity sensor modules having a separate glass layer.

Figure 3:
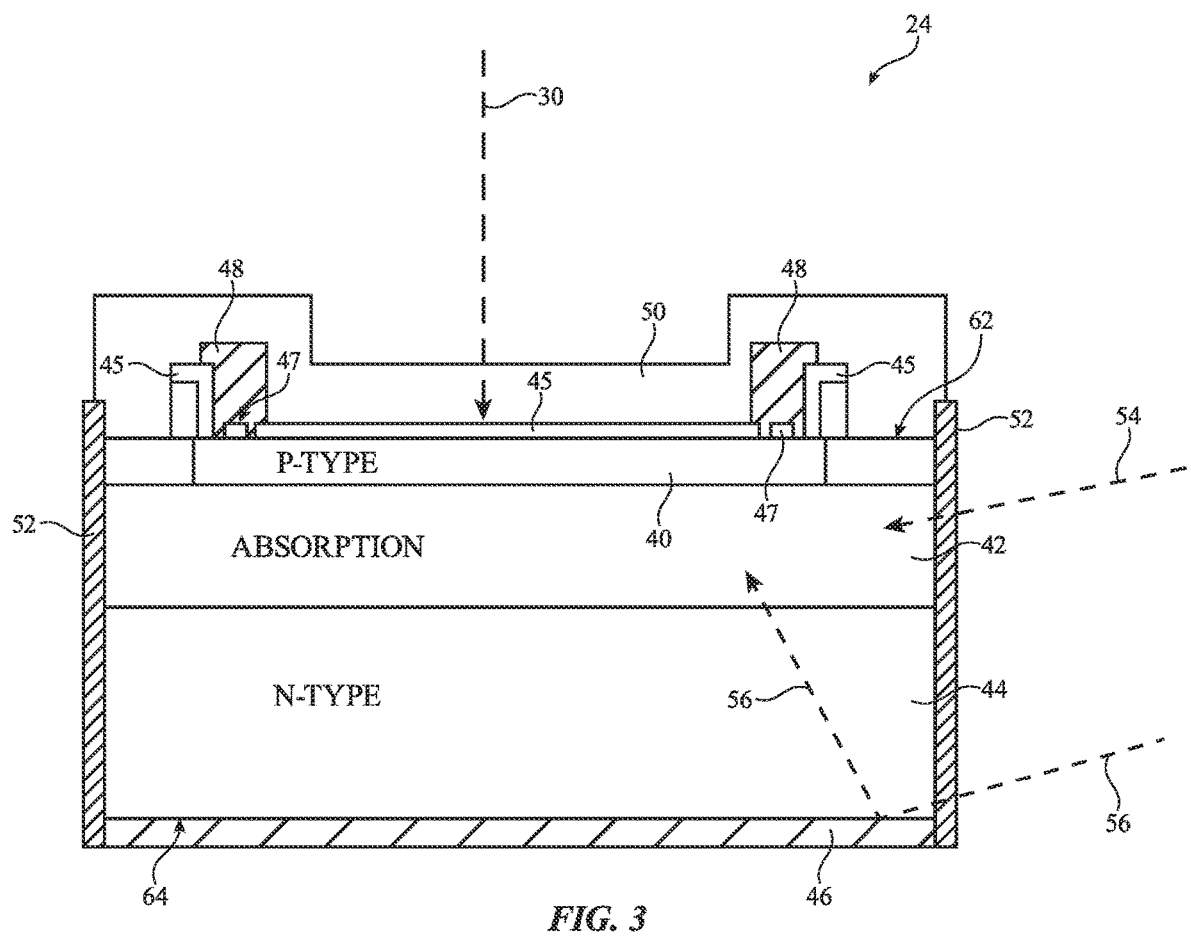
FIG. 3 is a cross-sectional side view of a light detector die having sidewalls covered with an opaque coating in accordance with some embodiments.

FIG. 3 is a cross-sectional side view of photodetector die 24 in accordance with some embodiments. As shown in FIG. 3, photodetector die 24 may have an upper (top) surface 62, a lower (bottom) surface 64, and one or more sidewalls extending from the upper surface 62 to the lower surface 64 (or vice versa). A p-type (p-doped) layer 40 may be formed at the upper surface 62 of semiconductor die 24. An n-type (n-doped) layer 44 may be formed at the lower surface 64 of semiconductor die 24. An intrinsic (undoped) layer 42 may be interposed between the p-type layer 40 and the n-type layer 44.

The p-type (P), intrinsic (I), and n-type (N) layers formed within die 24 in this way collectively forms a p-i-n (or PIN) photodiode that generates charge in response to excitation from incoming photons. During operation, the photodiode is typically operated in a reverse-biased mode, which creates an electric field in the intrinsic layer 42. Intrinsic layer 42 can absorb incoming photons and generates corresponding electron-hole pairs within layer 42. Intrinsic layer 42 is therefore sometimes referred to and defined as an absorption layer. The electron-hole pairs can be pulled apart by the electric field in layer 42, which causes the electrons to drift towards the n-type layer 44 and the holes to drift towards the p-type layer 40. The amount of electrons being conveyed to layer 44 can then be detected by external sensing circuitry as a photocurrent signal. This example in which photodetector die 24 is implemented as a p-i-n photodiode is merely illustrative. If desired, photodetector die 24 may include any suitable photosensitive element or component.

A backside conductive layer such metal layer 46 may be formed on the lower surface 64 of semiconductor die 24. Backside metal layer 46 may serve as an electrical contact to the n-type terminal of the photodiode. A frontside conductor such as conductor 47 may be formed on the front surface 62 of die 24. Conductor 47 may be formed as a ring-shaped conductor (when viewed from the front face of semiconductor die 24) and may therefore sometimes be referred to as a contact ring. An anti-reflection layer such as anti-reflection liner 45 may be formed on the front surface 62 of die 24 and surrounding contact ring 47. Conductive material such as metal 48 may be coupled to contact ring 47. Contact ring 47 and metal 48 may collectively serve as an electrical contact for the p-type terminal of the photodiode.

A bandpass filter layer 50 may be deposited over the photodiode on top of die 24. As described above in connection with FIGS. 2 and 4, bandpass filter layer (coating) 50 may be configured to selectively pass through only infrared light (as an example). Although bandpass filter coating 50 is shown as a single layer, coating 50 may in practice include multiple layers of alternating material. As an example, bandpass filter coating 50 may include alternating silicon oxide and silicon hydride layers. This is merely illustrative.

If desired, other materials can be used depending on the desired optical performance and requirements of proximity sensor 20.

Ideally, light enters photodetector die 24 from the upper surface of the die, as shown by incoming light ray 30. In practice, however, it is possible for incoming light to enter photodetector die 24 through its sidewall(s). In one scenario, light such as light ray 54 can directly reach absorption layer 42 by entering through the sidewall of photodetector die 24. This can cause electron hole pairs to be generated in layer 42, which results in photocurrent to be output from die 24. In another scenario, light such as light ray 56 can enter through the sidewall of photodetector die 24 and then reflect or scatter off of the backside metal layer 46 to reach absorption layer 42, which can also result in photocurrent to be output from die 24. Since no bandpass filter material is formed on the sidewalls of photodetector die 24, any resulting photocurrent caused by light entering through the sidewalls can produce a responsivity that deviates from the desired passband criteria. For example, light such as light ray 54 or 56 can cause the transmissivity of the stop band to be higher than expected, which can degrade the signal-to-noise ratio of photodetector die 24.

In accordance with an embodiment, photodetector die 24 may have one or more sidewalls covered with a sidewall light blocking layer such as blocking layer 52. A rectangular photodetector die 24 has four sidewalls and sidewall light blocking layer 52 can cover at least one sidewall, at least two sidewalls, at least three sidewalls, or all four sidewalls of die 24. Light blocking layer 52 can be a reflective coating layer formed from metallic coating or dielectric interference coating. Alternatively, light blocking layer 52 can be an adsorptive coating layer formed from black ink or other opaque (black) material. If desired, a black or other opaque tape can be used as an opaque covering for the sidewalls of die 24. By covering one or more sidewalls of die 24 with a reflective or absorptive coating layer, any potential sidewall illumination can be prevented (e.g., by blocking light rays 54 and 56), which can help optimize the signal-to-noise ratio of photodetector die 24. Light blocking layer 52 is therefore sometimes referred to as an opaque coating or an opaque coating layer.

Figure 5:
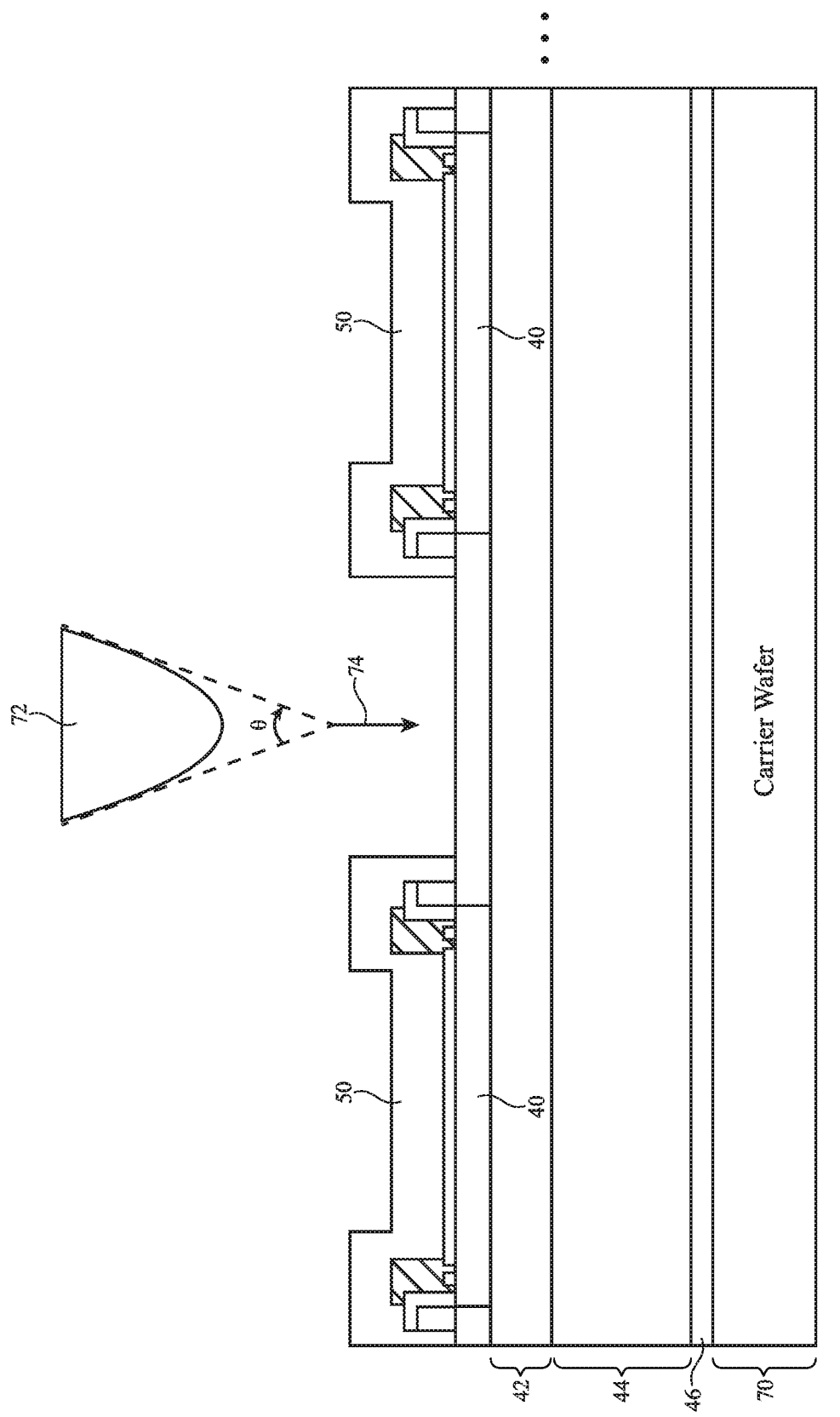

FIGS. 5-8 are cross-sectional side views showing an illustrative process for manufacturing photodetector dies 24 with opaque sidewall coating in accordance with some embodiments. FIG. 5 shows multiple photodiodes formed on a carrier wafer 70. Each of the photodiodes may be composed of a p-type layer 40, an intrinsic absorption layer 42, and an n-type layer 44 as described above in connection with FIG. 3. Layers 40, 42, and 44 are all formed in a semiconductor substrate (e.g., by selectively doping each portion of the semiconductor substrate with the desired doping profile to form a diode structure). Backside conductive layer 46 may be formed between the lower surface of the photodiode semiconductor substrate and wafer 70. A bandpass filter coating 50 may be formed over each respective photodiode. In general, tens, hundreds, or even thousands of photodiodes or other types of photosensitive elements can be formed on wafer 70.

As shown in FIG. 5, the array of photodiodes on wafer 70 can be cut into individual dies using semiconductor wafer dicing equipment having a dicing blade 72. Dicing blade 72 may have a relatively large blade angle θ that is defined as being equal to the angle from one blade edge to another. Blade angle θ may be equal to 20° or more, 30° or more, 40° or more, 50° or more, 60° or more, 30-50°, 20-60°, greater than 30°, greater than 40°, greater than 50°, etc. During wafer dicing operations, dicing blade 72 may be lowered in direction 74 towards the surface of the wafer to make a cut between adjacent photodiodes.

Figure 6A:
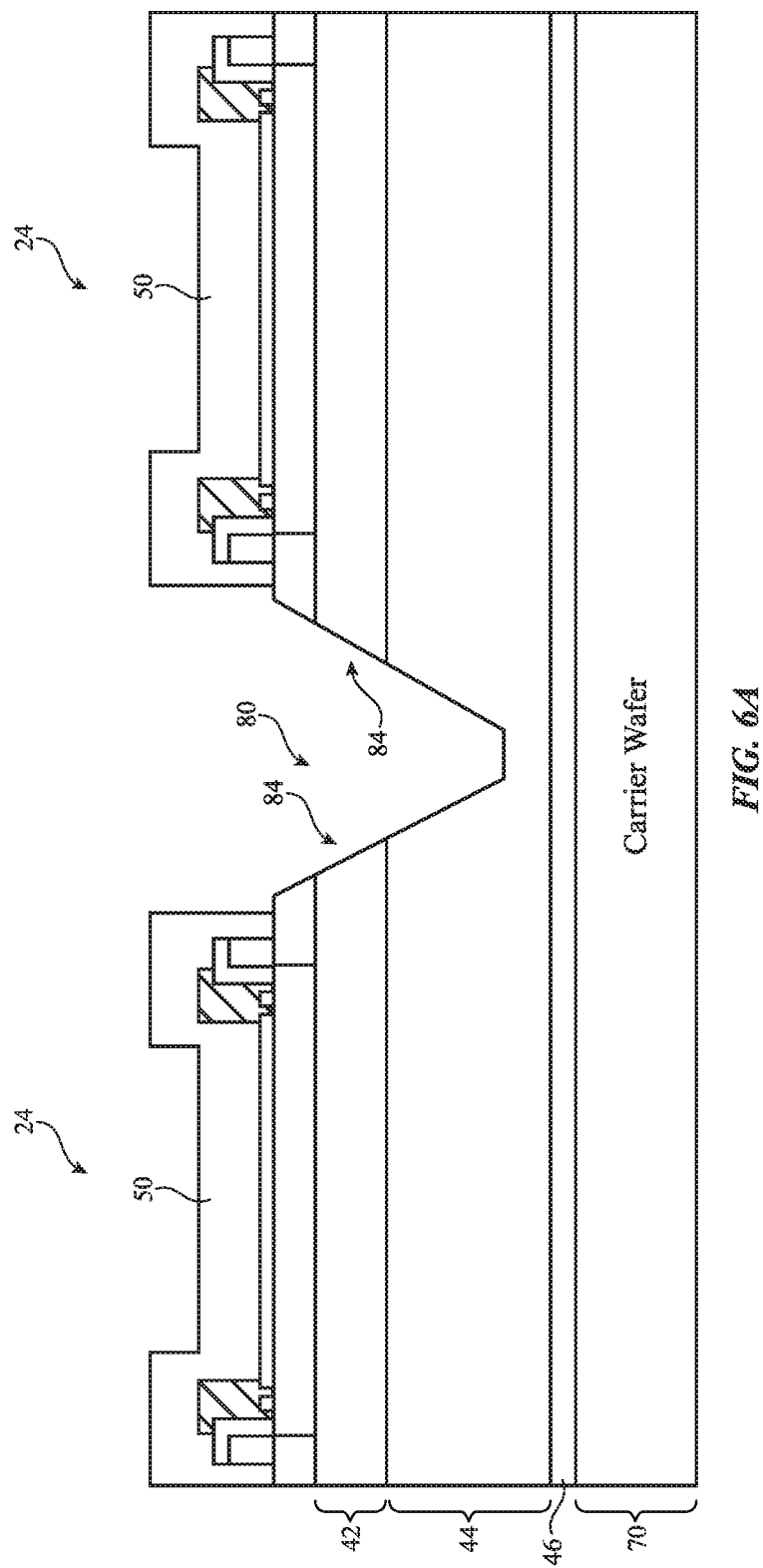

Dicing blade 72 may be used to form a partial cut into the semiconductor substrate or through the entire substrate. FIG. 6A shows one embodiment in which blade 72 makes a partial cut into the semiconductor substrate. As shown in FIG. 6A, a trench such as trench 80 is formed between two adjacent photodiodes using blade 72. Trench 80 extends from the upper surface of the substrate and only partially into n-type layer 44. The bottom of trench 80 sits above the backside metal layer 46. Using blade 72 with a large angle θ will result in photodetector dies having inclined sidewalls 84. Having inclined or sloped sidewalls 84 can help facilitate deposition of the opaque coating at a later processing step.

FIG. 6B shows another embodiment in which blade 72 makes a cut entirely through the semiconductor substrate. As shown in FIG. 6B, a trench such as trench 82 is formed between two adjacent photodiodes using blade 72. Trench 82 extends from the upper surface of the substrate all the way down into carrier wafer layer 70. In other words, trench 80 extends through the backside metal layer 46 and into wafer 70. Using blade 72 with a large angle θ will result in photodetector dies having inclined sidewalls 84. Having inclined or sloped sidewalls 84 can help facilitate deposition of the opaque coating at a later processing step.

Figure 7A:
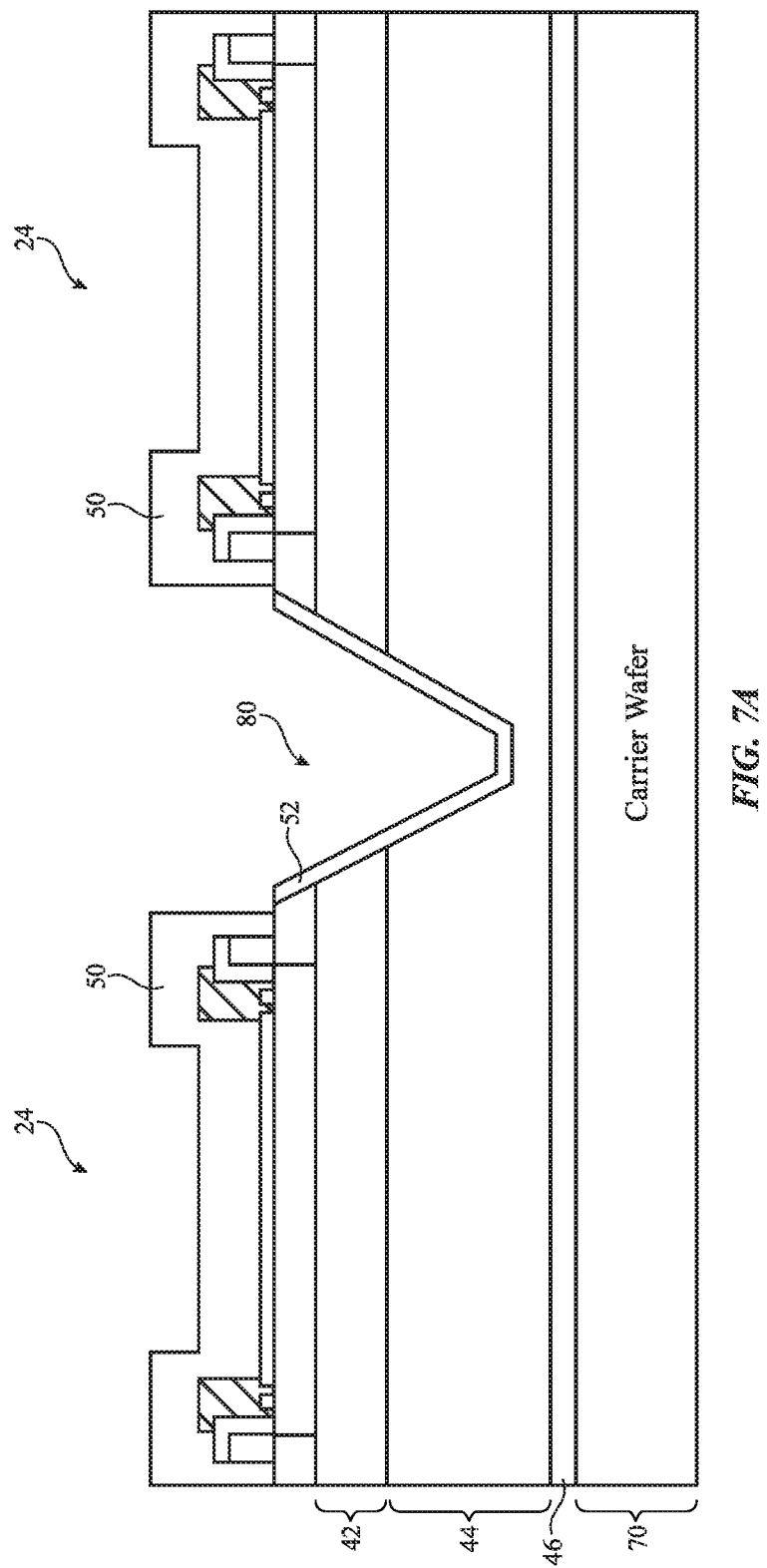

An opaque coating 52 can then be deposited and patterned to line the trenches formed by the dicing blade. FIG. 7A shows how trench 80 shown in FIG. 6A is lined with opaque coating 52. FIG. 7B shows how trench 82 of FIG. 6B is lined with opaque coating 52. Opaque coating 52 can be deposited using physical vapor deposition, sputtering, spin-on coating, electroplating (if forming a metal liner), chemical vapor deposition, electrochemical deposition, or other deposition techniques. Opaque coating 52 is therefore sometimes referred to as an opaque liner or opaque film. Opaque coating 52 can be patterned to be formed only inside the trenches (e.g., trench 80 or 82) via shadow mask patterning, lift off patterning, or other photolithography patterning techniques.

Figure 8A:
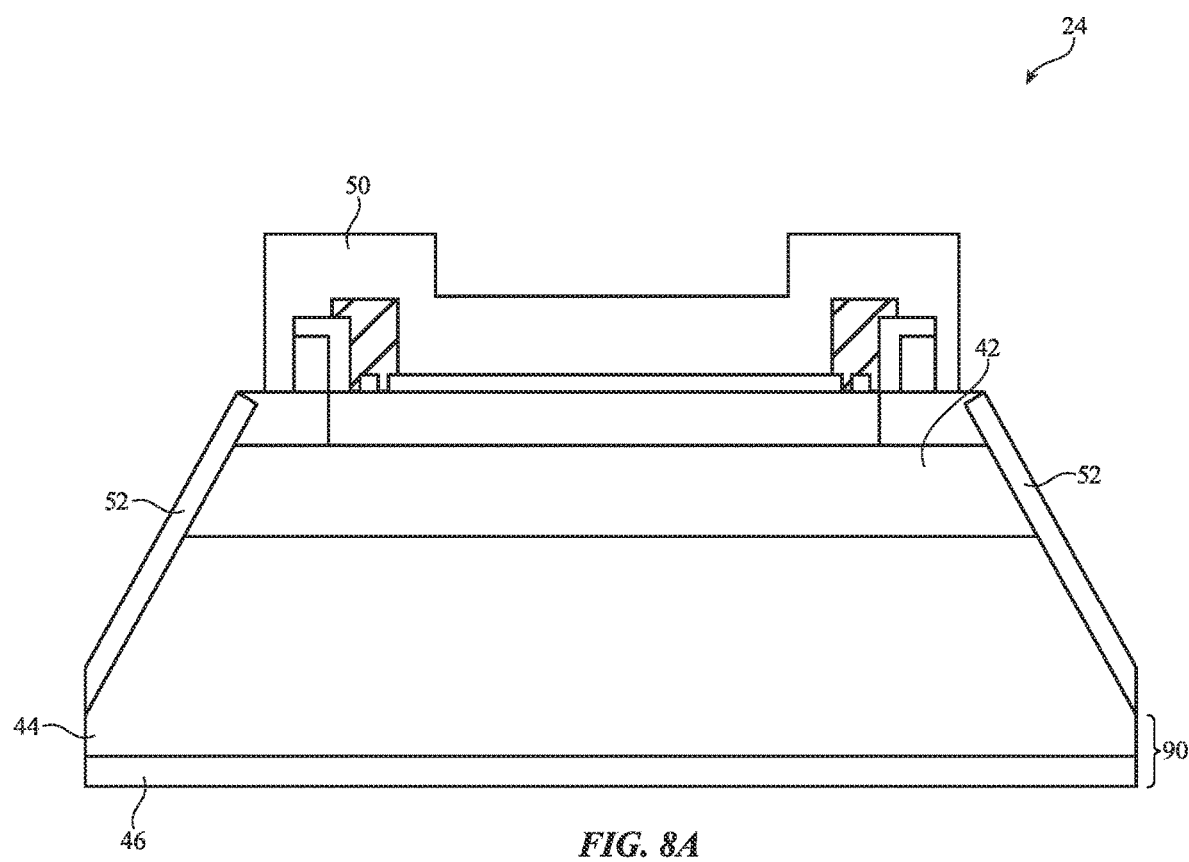

After opaque coating 52 has been formed, a final dicing or splintering operation can be performed to completely separate adjacent dies and the carrier wafer 70 can be de-bonded from the semiconductor dies. The wafer de-bonding operation can be performed before or after the final dicing/splintering operation. FIG. 8A shows a photodetector die 24 following from the example of FIG. 7A. Since trench 80 only extends partially into the semiconductor substrate, opaque layer 52 only partially covers the sidewalls. As shown in FIG. 8A, a first portion of the sidewalls (i.e., the inclined portion of the sidewall) is covered by opaque layer 52 whereas a second portion of the sidewalls (i.e., the vertical or non-inclined portion of the sidewall) is left exposed and not covered by any opaque material. Here, opaque coating 52 is not in physical contact with the backside reflective conductor 46.

Figure 8B:
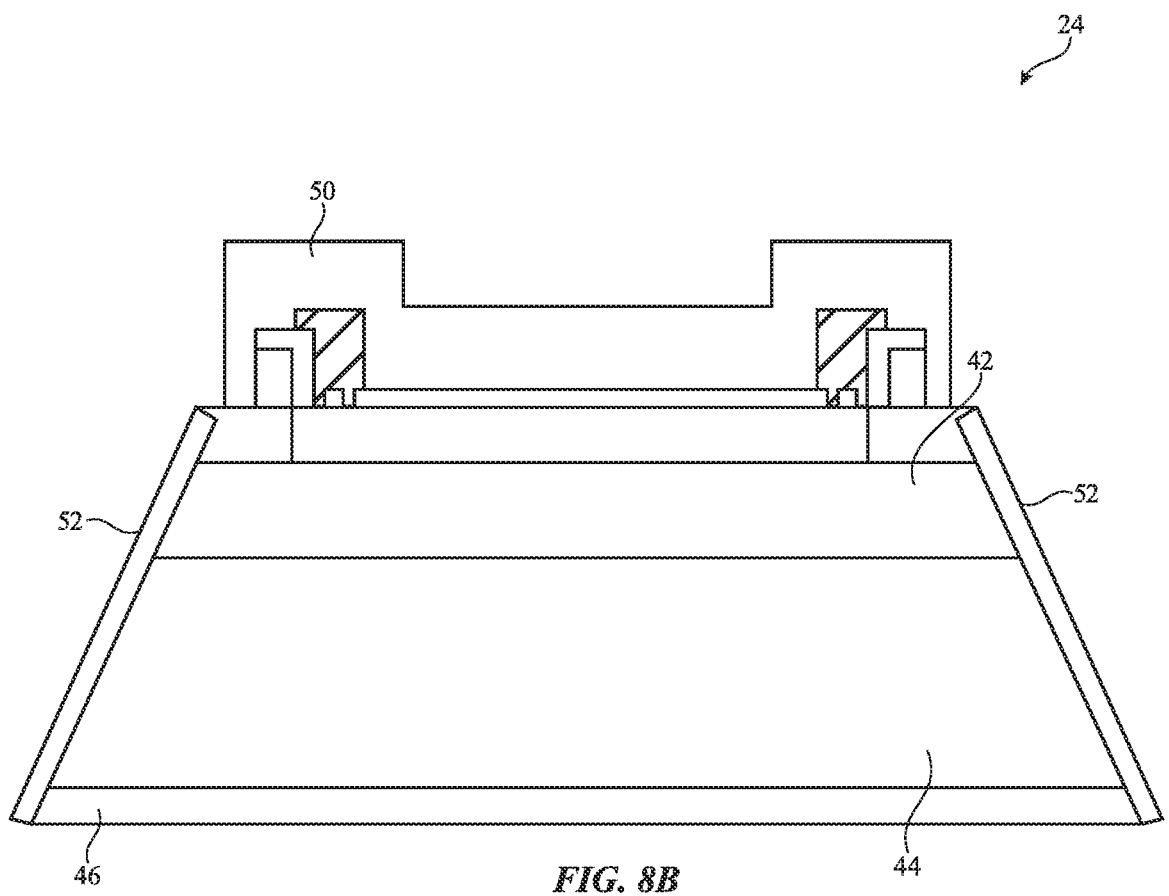

FIG. 8B shows a photodetector die 24 following from the example of FIG. 7B. Since trench 82 extends entirely through the semiconductor substrate, opaque layer 52 completely covers the sidewalls. As shown in FIG. 8B, photodetector die 24 has an inclined sidewall that is completely lined with opaque coating 52. In the example of FIG. 8B, opaque coating 52 is in direct physical contact with the backside reflective conductor 46. The embodiment of FIG. 8B might provide better sidewall illumination protection compared to the embodiment of FIG. 8A since it does not have any exposed sidewall portions.

Figure 9:
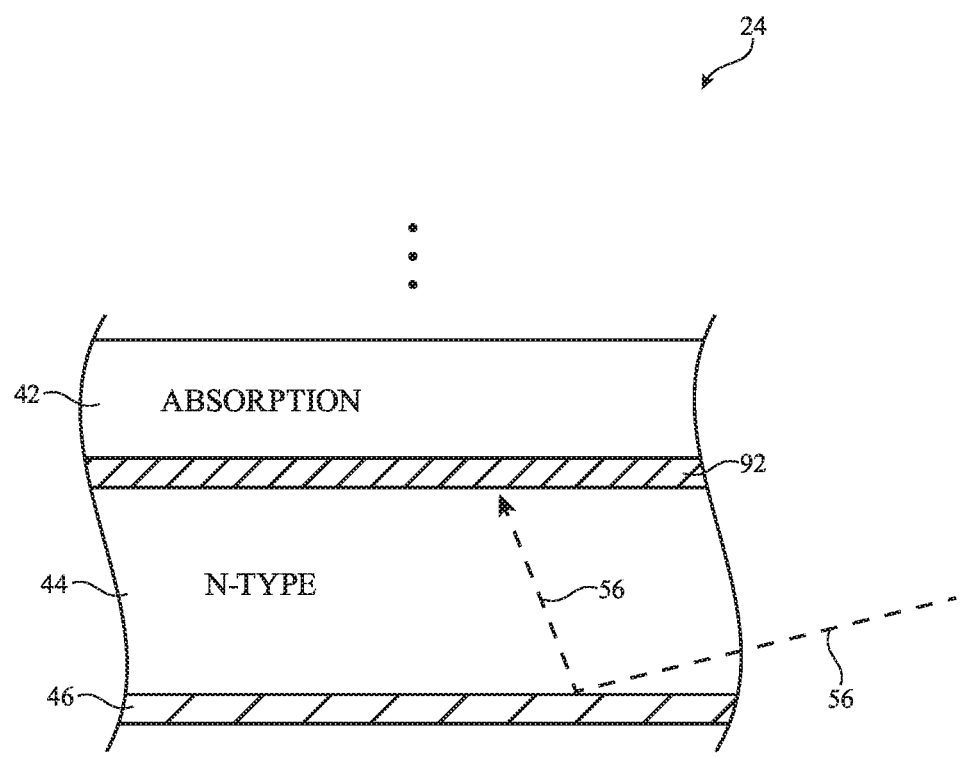
FIG. 9 is a cross-sectional side view of an illustrative light detector die having a backside reflection absorption layer in accordance with some embodiments.

FIG. 9 illustrates another suitable embodiment having an additional light blocking layer such as light blocking layer 92 interposed between the intrinsic absorption layer 42 and the n-type layer 44. Light blocking layer 92 may be a heavily doped n-type (e.g., n++) layer. Heavily doped n-type layer 92 can absorb light reflecting off of backside metal layer 46 (see light ray 56) and is therefore sometimes referred to as a backside reflector light absorption layer. Light blocking layer 92 may be included in a photodetector die 24 having an opaque coating on the sidewalls (e.g., die 24 of the type shown in FIG. 2, 3, 8A, or 8B) or a photodetector die having no sidewall protection. The example of FIG. 9 in which light blocking layer 92 is formed as an adjacent layer below the absorption layer 42 and above the n-type layer 44 is merely illustrative. In another suitable embodiment, light blocking layer 92 might be embedded within the n-type layer 44 (e.g., layer 92 may be formed as an intermediate layer somewhere between the upper surface of layer 44 and the lower surface of layer 44).

Figure 10:
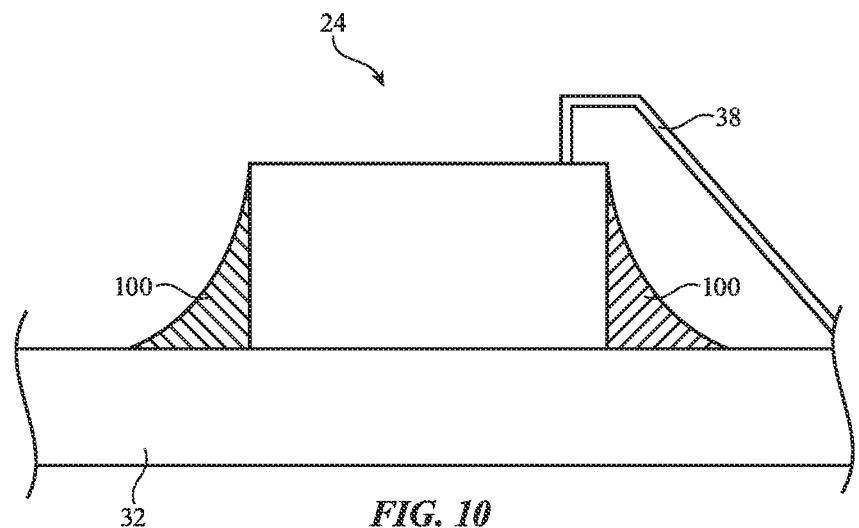
FIG. 10 is a side view of an illustrative light detector die having sidewalls covered with black epoxy material in accordance with some embodiments.

The embodiments of FIGS. 3-9 describing light blocking/absorption coating layer(s) within photodetector die 24 to block stray light entering through the sidewalls of die 24 is merely illustrative. FIG. 10 illustrates another suitable embodiment in which opaque material is disposed along the sidewalls of photodetector die 24 after die 24 has been mounted on substrate (PCB) 32. As shown in FIG. 10, opaque material 100 surrounds the lateral edges of photodetector die 24 and covers one or more sidewalls of die 24. Material 100 may be used to glue or adhere die 24 onto the upper surface of substrate 32. Material 100 may be black epoxy or other opaque adhesive (glue) material. Opaque material 100 can completely cover the sidewalls or might only partially cover the sidewalls (e.g., a portion of the sidewalls near the upper surface of the photodetector substrate might be exposed or not covered by the black epoxy). The example of FIG. 10 in which photodetector die 24 is shown as being wire-bonded to substrate 32 via one or more wires 38 is merely illustrative. In other suitable configurations, die 24 may be bonded to substrate 32 via metal contact leads or flip-chip bonded to substrate 32 via solder balls or pins.

The foregoing is merely illustrative and various modifications can be made to the described embodiments. The foregoing embodiments may be implemented individually or in any combination.

What is claimed is:

1. An optical device comprising:
a substrate;
a semiconductor die mounted on the substrate, the semiconductor die having an upper surface, a lower surface, a sidewall extending between the upper and lower surfaces, an opaque coating covering the sidewall, a p-type layer formed at the upper surface, an n-type layer formed at the lower surface, and an intrinsic layer interposed between the p-type layer and the n-type layer; and
a package enclosure attached to the substrate and having an opening through which light passes through to the upper surface of the semiconductor die.

2. The optical device of claim 1, further comprising:
a light source configured to emit light, wherein the semiconductor die is configured to measure an amount of the light reflecting back from an external object to produce a proximity sensor reading.

3. The optical device of claim 1, further comprising:
a ring-shaped conductor electrically coupled to the p-type layer.

4. The optical device of claim 1, further comprising:
an anti-reflective coating at least partially covering the p-type layer.

5. The optical device of claim 1, further comprising:
a bandpass filter layer formed over the photodiode, wherein the bandpass filter layer is configured to pass light having wavelengths in a plurality of infrared passbands separated by at least one stop band.

6. The optical device of claim 1, further comprising:
a reflective conductor electrically coupled to the n-type layer.

7. The optical device of claim 6, wherein the opaque coating is in physical contact with the reflective conductor.

8. The optical device of claim 6, wherein the opaque coating is not in physical contact with the reflective conductor.

9. The optical device of claim 1, wherein the semiconductor die further comprises a light blocking layer interposed between intrinsic layer and the n-type layer.

10. The optical device of claim 1, wherein the semiconductor die further comprises a light blocking layer formed between an upper surface and a lower surface of the n-type layer.

Table of Reference Numerals

| | | | |
|---|---|---|---|
| 10 | Electronic device | 16 | Control circuitry |
| 18 | Input-output devices | 20 | Proximity sensor |
| 22 | Light source (emitter die) | 24 | Light detector (photodetector die) |
| 28 | External object | 26, 30, 54, 56 | Light rays |
| 32 | Substrate | 34 | Package enclosure |
| 36 | Openings | 38 | Wires |
| 40 | P-type layer | 42 | Intrinsic layer |
| 44 | N-type layer | 45 | Anti-reflective coating |
| 46 | Backside metal layer | 47 | Contact ring |
| 48 | Metal | 50 | Bandpass filter coating |
| 52 | Opaque coating | 60 | Curve |
| 62 | Upper (front) surface | 64 | Lower (back) surface |
| 72 | Blade | 74 | Direction |
| 70 | Carrier wafer | 80, 82 | Trench |
| 84 | Sidewall | 90 | Exposed sidewall portion |
| 92 | Light blocking layer | 100 | Opaque material |

11. An optical device comprising:
a substrate;
a semiconductor die mounted on the substrate, the semiconductor die having an upper surface, a lower surface, a sidewall extending between the upper and lower surfaces, and an opaque coating covering the sidewall; and
a package enclosure attached to the substrate and having an opening through which light passes through to the upper surface of the semiconductor die, wherein the sidewall of the semiconductor die is only partially covered by the opaque coating.

12. The optical device of claim 1, wherein the sidewall of the semiconductor die is completely covered by the opaque coating.

13. The optical device of claim 1, wherein the sidewall of the semiconductor die comprises an inclined sidewall.

14. The optical device of claim 11, wherein the sidewall of the semiconductor die has an inclined portion covered by the opaque coating and a vertical portion not covered by the opaque coating.

15. The optical device of claim 1, further comprising:
black epoxy used to mount the semiconductor die onto the substrate.

16. An electronic device comprising:
an input-output device;
a proximity sensor module configured to detect when a human body part is in a vicinity of the electronic device, wherein the proximity sensor module comprises:
a printed circuit board;
a light emitter die mounted on the printed circuit board;
a light detector die mounted on the printed circuit board;
opaque material configured to adhere the light detector die to the printed circuit board; and
a package enclosure attached to the printed circuit board and having windows aligned to the light emitter die and the light detector die; and
control circuitry configured to adjust the input-output device in response to detecting that a human body part is in the vicinity of the electronic device.

17. The electronic device of claim 16, wherein:
the light detector die has an upper surface, a lower surface, and sidewalls extending between the upper and lower surfaces; and
the opaque material comprises black epoxy covering the sidewalls of the light detector die.

18. The electronic device of claim 16, wherein the light detector comprises:
a photodiode having an absorption layer, an n-type layer, and a light blocking layer interposed between the absorption layer and the n-type layer.

19. The electronic device of claim 18, wherein the light detector further comprises:
a conductor formed on the n-type layer.

* * * * *